3,803,215
PROCESS FOR PREPARING DIMETHYL
1,5-HEXADIENE-2,5-DICARBOXYLATE
Dennis C. Owsley, St. Louis, and Jordan J. Bloomfield,
Creve Coeur, Mo., assignors to Monsanto Company,
St. Louis, Mo.
No Drawing. Filed Jan. 4, 1971, Ser. No. 103,898
Int. Cl. C07c 69/52
U.S. Cl. 260—485 R     1 Claim

ABSTRACT OF THE DISCLOSURE

The present invention relates to a process for making bicyclo[2.2.0]hexanes and 1,5-hexadienes. The compounds produced in this process are of utility a intermediates in the preparation of polymeric materials.

The present invention relates to a new process for making substituted bicyclo[2.2.0]hexanes (I) and 1,5-hexadienes (II), where $R_1$, $R_2$, $R_3$, $R_4$, $R_5$, $R_6$, $R_7$, $R_8$, $R_9$, and $R_{10}$ are substituents.

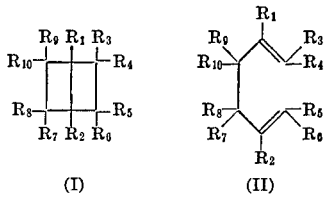

(I)          (II)

The substituent $R_1$ is selected from the following:

(a) Carboxylic acid radicals;
(b) Carboxylic acid esters;
(c) Carboxylic acid amides (unsubstituted or mono or disubstituted with alkyl or aryl groups having 1 to 20 carbon atoms);
(d) Carbonyl moieties substituted with hydrogen or with alkyl or aryl groups having 1 to 20 carbon atoms;
(e) Aryl groups having 6 to 20 carbon atoms;
(f) Aroxyl groups having 6 to 20 carbon atoms;
(g) Nitrile groups.

The substituent $R_2$ can be chosen from the following groups:

(a) The same groups as $R_1$;
(b) Hydrogen;
(c) Halogens such as flourine, chlorine, bromine or iodine;
(d) Alkyl and alkoxyl hydrocarbon radicals of 1 to 20 carbon atoms, such as alkyl radicals having branched chain, straight chain and cyclic structures.

The substituents $R_3$ through $R_{10}$ can be chosen from the following:

(a) All of the groups enumerated above;
(b) Carboxylic acid anhydrides;
(c) Carboxylic acid imides (unsubstituted or mono or disubstituted with alkyl or aryl groups having from 1 to 20 carbon atoms);
(d) Amines (unsubstituted or mono or di-substituted with alkyl or aryl groups having from 1 to 20 carbon atoms).

The radicals enumerated for $R_1$ through $R_{10}$ may also be substituted with other radicals such as those enumerated above and with such groups as:

(a) Nitro groups;
(b) Sulfhydryl groups;
(c) Thioethers;
(d) Phosphines, phosphine oxides, phosphorus esters and halophosphines.

Examples of radicals includes the following representative compounds:

$R_1$ and $R_2$ in the above formulae:
 carboxylic acid radicals (such as in bicyclo[2.2.0]hexane-1,4-dicarboxylic acid or 1,5-hexadiene-2,5-dicarboxylic acid)
 carboxylic acid esters (such as in methyl or dodecyl esters of the immediately preceding compounds)
 carboxylic acid amides (such as in bicyclo[2.2.0]hexane-1,4-bis-(N,N-dimethylcarboxamide) or 1, 5 hexadiene-2,5-bis-(N,N - didecylcarboxamide) or bicyclo[2.2.0]hexane-1-carboxylic acid 4-carboxamide
 carbonyl moieties (such as in bicyclo[2.2.0]hexane-1 - carboxaldehyde or 1,5-hexadiene-2,5-dicarboxaldehyde or methyl-1-bicyclo[2.2.0]hexylketone or didecyl-1-bicyclo[2.2.0]hexyl ketone)
 aryl groups (such as in 1-phenylbicyclo[2.2.0]hexane or 2-(9-anthranyl)-1,5-hexadiene)
 aroxyl groups (such as in 4-phenoxy-bicyclo[2.2.0]hexane-1-carboxylic acid or 5-(9-anthroxy)-1,5-hexadiene-2-carboxaldehyde
 nitriles (such as in bicyclo[2.2.0]hexane-1,4-dicarbonitrile or 1,5-hexadiene-2-carbonitrile)
 hydrogen (such as in bicyclo[2.2.0]hexane-1-carboxylic acid or 1,5-hexadiene-2-carboxylic acid)
 halogen (such as in methyl 4-chlorobicyclo[2.2.0]hexane-1-carboxylate or methyl-5-bromo-1,5-hexadiene-2-carboxylate
 alkyl and alkoxyl hydrocarbon radicals of 1 to 20 carbon atoms having branched chain, straight chain and cyclic structures (such as in 4-(2-didecyl)bicyclo[2.2.0]hexane - 1 - carboxamide or methyl-1,5-hexadiene - 2 - carboxaldehyde or 4-cyclohexylbicyclo[2.2.0]hexane-1-carbonitrile)

$R_3$—The substituents $R^3$ through $R_{10}$ can be chosen from the following:

all of the groups enumerated above
 carboxylic acid anhydrides (such as in dimethyl bicyclo[2.2.0]hexane-2,3-dicarboxylic anhydride - 1,4 - dicarboxylate or dimethyl-1,5-hexadiene - 3,4 - dicarboxylic anhydride-2,5-dicarboxylate)
 carboxylic acid imides (such as in 1-phenylbicyclo[2.2.0]hexane-2,3-dicarboxylic imide or 1,5-hexadiene-3,4-N-phenyldicarboximide-2-carboxaldehyde or 1,5 - hexadiene-3,4-N-didecyldicarboximide-2-carboxylic acid)

The radicals $R_3$ through $R_{10}$ may also be substituted with other radicals such as those enumerated above and with such groups as:

nitro groups (such as in 1 - (p-nitrophenyl)bicyclo[2.2.0]hexane or 2-(m-nitrophenyl)-1,5-hexadiene)
 amines (such as in 1-(m-aminophenyl)bicyclo[2.2.0]hexane or 2 - (p-N,N-dimethylaminophenyl)-1,5-hexadiene or 1 - (p-N-didecylaminophenyl)bicyclo[2.2.0]hexane)
 sulfhydryl groups (such as in dimethyl 3-(2-mercaptoethyl)bicyclo[2.2.0]hexane-1,4-dicarboxylate or 2-(p-mercaptophenyl)-1,5-hexadiene)
 thioethers (such as in 1 - (p-methylmercaptophenyl)bicyclo[2.2.0]hexane or 2 - (m - methylmercaptophenyl)-1,5-hexadiene)
 phosphines, phosphine oxides, halophosphines and phosphorus esters (such as in 3-(1-phenyl)bicyclo[2.2.0]hexyltriphenyl phosphine or 3 - (1-phenyl)bicyclo[2.2.0]hexyltriphenylphosphine oxide)

The bicyclo[2.2.0]hexanes undergo isomerization to 1,5-hexadienes at temperatures from 50° C. to 400° C. depending upon the substituents $R_1$ and $R_2$. Historically, the synthesis of the bicyclo[2.2.0]hexane system and substituted 1,5-hexadienes has required many steps. The present invention relates to a general procedure for the synthesis of bicyclo[2.2.0]hexanes and 1,5-hexadienes. The invention also includes a one-step process without the removal or isolation of intermediate products for preparing substituted 1,5-hexadienes.

The substituted bicyclo [2.2.0]hexanes (I) are obtained by the photolysis of an appropriately substituted acetylene derivatives in the presence of an excess of the appropriately substituted olefins. The substituted 1,5-hexadienes (II) are obtained by a thermal isomerization of the bicyclo[2.2.0] hexanes, employing generalized formulae (see below).

Cyclobutenes are produced initially, but under the reaction conditions are very short-lived and go on to the [2.2.0] bicyclohexane derivatives. Thus, an alternate synthesis of the bicycle[2.2.0]hexanes comprises subjecting a solution of the substituted cyclobutene and the appropriately substituted olefin to ultraviolet light. The 1,5-hexadienes are obained as above.

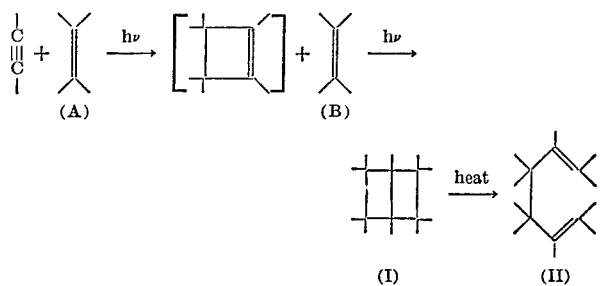

(olefins A and B may be either the same or different)

In carrying out the photolysis reaction, the acetylenic compound is dissolved in dichloromethane or in hydrocarbon solvents such as pentane or hexane which do not absorb light above 200 m$\mu$, and in which the same has sufficient solubility to allow the reaction to occur. The solution is placed in a vessel such as a metal or a glass reactor. The preferred vessel is a Pyrex resin kettle which has been fitted with a cooling coil and transparent quartz Dewar. A quartz irradiation well fits inside the transparent quartz Dewar. The solution is deoxygenated by bubbling nitrogen through the solution, which is then maintained under nitrogen pressure to exclude air. If the olefin of choice is a gas such as ethylene or propylene, it is bubbled through the solution. If the olefin of choice is a solid or a liquid such as cyclohexene or 1,2-dichloroethylene, it is placed in the solution in excess over the acetylene substrate. The vessel is cooled with Dry Ice-acetone and a coolant is pumped through the cooling coils to maintain a temperature of less than 0° C. and the solution is irradiated using a wavelength of at least 200 millimicrons (m$\mu$) or preferably from 200 to 400 m$\mu$ and still more preferably from 200 to 300 m$\mu$. A convenient light source is a medium pressure mercury arc. For a sample of about 0.1 mol, 18 hours irradiation time is sufficient, using a 450 watt Hanovia mercury arc as the light source. In general, the reaction may be followed by conventional techniques such as UV or NMR spectroscopy or by gas chromatography. If the bicyclo[2.2.0]hexane derivative is desired, the solvent may be removed at low temperatures around 0° C. to —15° C.) and the product subjected to a molecular distillation at room temperature and reduced pressure in order to avoid isomerization of the bicyclo[2.2.0]hexane derivative to the 1,5-hexadiene derivative.

In the second stage of the process, if the 1,5-hexadiene derivative is desired, the solution is heated to a temperature sufficient to isomerize the bicyclo[2.2.0]hexane derivative to the 1,5-hexadiene derivative as the solvent is removed (e.g. a temperature of 75° C. for dimethyl bicyclo [2.2.0]hexane-1,4-dicarboxylate). The 1,5-hexadiene can be distilled or recrystallized in a conventional manner. The photolysis and heating stages of the process may be conducted in the same vessel without isolation of the intermediate products.

The photolysis may also be carried out using a photosensitizer such as benzophenone or acetophenone to bring about the transformation. In these transformations, acetone may be used as the solvent. For the photosensitized reaction it is preferable that the light source emits light above 300 m$\mu$; the irradiation well may be made of Pyrex, however a Pyrex filter inside the quartz irradiation well is also satisfactory in order to filter out the light of lower wavelengths. In this procedure, the acetylene does not absorb light directly, but energy for the reaction is transferred from the photosensitizer, which absorbs light but itself does not react.

The following examples illustrate specific embodiments of the invention.

EXAMPLE 1

A solution of 14.2 g. of dimethylacetylene dicarboxylate is dissolved in 2800 ml. of dichloromethane and placed in a 4000 ml. Pyrex resin kettle fitted with quartz Dewar, gas inlet tube and Pyrex cooling coil. A quartz irradiation well is placed inside of the quartz Dewar. The flask is cooled to —80° C. with a Dry Ice-acetone bath and by circulating liquid nitrogen through the cooling coil. Nitrogen is bubbled through the solution until the solution temperature reaches —80° C. Then, ethylene is bubbled through the solution for 1 hour. The solution is irradiated with a 450 watt medium pressure mercury arc for 18 hours. The light is turned off and the —80° C. solution is pumped into the evaporation flask of a rotary film evaporator held at —15° C. with an ice-acetone bath. The solvent is removed at a pressure of 1 mm. After all of the solvent has been removed the product is distilled on a molecular still at room temperature and at a pressure of $10^{-4}$ mm. to yield 11.9 g. of crude dimethyl bicyclo[2.2.0]hexane 1,4-dicarboxylate as a clear oil. Removal of the isomeric 1,1'-dimethyl dicyclopropyl dicarboxylate which is present as an impurity (about 10%) is accomplished by partial crystallization from pentane at —30° C. The structure of the bicyclo[2.2.0]hexane is proved by quantitative elemental analysis. Calculated for $C_{10}H_{14}O_4$ (percent): C, 60.59; H, 7.12. Found (percent): C, 60.66; H, 7.22. In addition, the structure is supported by its mass spectrum (molecular weight—198, calculated—198) and its NMR spectrum; singlet at delta 3.66 (6 protons)—the $OCH_3$ protons and a broad multiplet from delta 2.90 to delta 2.00 (4 protons)—the ring protons.

EXAMPLE 2

The photolysis is carried out as described above on dimethyl acetylene dicarboxylate in the presence of ethylene except that the solvent is removed at 25° C. on the rotary film evaporator. The product is distilled at 70–71° C./0.2 mm. to yield 11.9 g. of 2,5-dicarbomethoxy-1,5-hexadiene as a clear oil which solidifies on standing. The structure of this product is proved by its melting point (25–6° C.) and its NMR and mass spectra.

EXAMPLE 3

A solution of 10.0 g. (0.0588 mol) of dimethyl cyclobutene-1,2-dicarboxylate in 2800 ml. of dichloromethane is photolyzed with a 450 watt Hanovia medium pressure mercury arc in the reactor described above. After the solution is deoxygenated and saturated with ethylene at —70° C., the lamp is turned on. This photolysis is complete in 3 hours. The solvent is removed at —15°· C. on a rotary film evaporator at 1 mm. pressure to yield 11.6 g. of dimethyl bicyclo[2.2.0]hexane-1,4-dicarboxylate whose structure is established above.

EXAMPLE 4

A solution of 5.0 grams of dimethyl bicyclo[2.2.0] hexane-1,4-dicarboxylate is refluxed in 200 ml. of chloroform for 4 hours. The chloroform is removed on the rotary film evaporator to yield 5.0 grams of 2,5-dicarbomethoxy-1,5-hexadiene.

EXAMPLE 5

In order to illustrate other embodiments of the invention using various substituted starting materials, the following table shows the product obtained employing such starting materials.

In order to show the variations which result from the use of various substituted acetylenes and olefins, the table below lists the major products obtained in carrying out the process of Examples 1 and 2 with the respective starting materials.

| Starting materials | Major products |
|---|---|
| Dimethyl acetylene dicarboxylate and 1,2-dichloroethylene. | Dimethyl 2,3,5,6-tetrachlorobicyclo[2.2.0]-hexane-1,4-dicarboxylate (isolated as in Example 1). |
| | 2,5-dicarbomethoxy-1,3,4,6-tetrachloro-1,5-hexadiene (isolated as in Example 2). |
| Dimethyl acetylenedicarboxylate and cyclohexane. | Dimethyl tetracyclo[8.4.0.0.$^{2,9}$0.$^{3,8}$] tetradecane-2,9-dicarboxylate (isolated as in Example 1). |
| | Dimethyl bicyclo[8.4.0]tetradeca-2,8-diene-2,9-dicarboxylate (isolated as in Example 2). |
| Dicyanoacetylene and ethylene. | 1,4-dicyano bicyclo[2.2.0]hexane (isolated as in Example 1). |
| | 2,5-dicyano-1,5-hexadiene (isolated as in Example 2). |
| Diphenylacetylene and ethylene. | 1,4-diphenyl bicyclo[2.2.0]hexane (isolated as in Example 1). |
| | 2,5-diphenyl-1,5-hexadiene (isolated as in Example 2). |
| Dimethyl cyclobutene-1,2-dicarboxylate and cyclohexene. | Dimethyl tricyclo[4.4.0.0$^{2,5}$]decane-2,5-dicarboxylate (isolated as in Example 1). |
| | Dimethyl cyclodeca-1,7-diene-1,8-dicarboxylate (isolated as in Example 2). |

The compounds which are produced in the present process are of utility as intermediates in the preparation of polymeric materials. An example is a copolymer prepared from methyl acrylate and 2,5-dicarbomethoxy-1,5-hexadiene. A homopolymer of the 2,5-dicarbomethoxy-1,5-hexadiene has been previously reported. The polymerizations have been carried out using peroxide catalysts in either organic solvents such as benzene or using an emulsion system.

What is claimed is:

1. Process for making dimethyl 1,5 - hexadiene-2,5-dicarboxylate comprising subjecting a solution of dimethyl acetylenedicarboxylate and ethylene to light of wavelength of 200 mµ to 400 mµ at a temperature below 0° C. and thereafter in absence of said light heating the solution at a temperature sufficient to bring about the isomerization of the dimethyl bicyclo[2.2.0]hexane-1,4-dicarboxylate to the dimethyl 1,5-hexadiene-2,5-dicarboxylate.

References Cited
UNITED STATES PATENTS
3,098,867  7/1963  Marvel et al. _____ 260—485 R LORRAINE A. WEINBERGER, Primary Examiner E. J. SKELLY, Assistant Examiner U.S. Cl. X.R.

204—158 R, 162 R, 163 R; 260—326 R, 326 C, 326 A, 326 HL, 346.3, 464, 465 B, 465 D, 465 F, 465 G, 465 K, 465.4, 465.5 R, 465.6, 465.7, 465.8 R, 465.9, 468 G, 473 F, 473 G, 482 R, 484 R, 485 H, 486 R, 486 H, 487, 514 G, 521 R, 521 A, 526 N, 534 R, 535 R, 535 H, 537 N, 537 S, 539 R, 557 B, 558 R, 559 R, 559 B, 561 N, 576, 577, 578, 586 R, 593 R, 593 H, 594, 598, 600, 601 R, 601 H, 602, 606.5 P, 609 R, 609 D, 644, 645, 646, 668 R, 668 A, 668 F, 673.5